(12) United States Patent
Pratt

(10) Patent No.: US 6,952,593 B2
(45) Date of Patent: Oct. 4, 2005

(54) MULTI-BAND TRANCEIVERS WITH REDUCED FREQUENCY SOURCES FOR DIGITAL TRANSMISSIONS

(75) Inventor: Stephen J. Pratt, Cumming, GA (US)

(73) Assignee: Matsushita Mobile Communications Development Corporation of U.S.A., Suwanee, GA (US)

( * ) Notice: Subject to any disclaimer, the term of this patent is extended or adjusted under 35 U.S.C. 154(b) by 826 days.

(21) Appl. No.: 09/923,978

(22) Filed: Aug. 7, 2001

(65) Prior Publication Data

US 2004/0152484 A1 Aug. 5, 2004

(51) Int. Cl.[7] .............................................. H04B 1/38
(52) U.S. Cl. ........................ 455/552.1; 455/73; 455/78; 455/86; 455/553.1
(58) Field of Search ............................ 455/73, 78, 84, 455/86, 552.1, 553.1

(56) References Cited

U.S. PATENT DOCUMENTS 6,438,358 B1 * 8/2002 Higuchi ....................... 455/84
6,587,673 B2 * 7/2003 Higuchi ....................... 455/84

* cited by examiner

*Primary Examiner*—Fan Tsang
*Assistant Examiner*—Md Shafiul Elahee
(74) *Attorney, Agent, or Firm*—Needle & Rosenberg, PC

(57) ABSTRACT

A system and method for using a dual band transceiver to transmit and receive in a first and second band, while reducing the frequency sources. By reducing the number of frequency sources needed to operate a dual band transceiver and using common transmitter and receiver Intermediate Frequencies, the invention also reduces the number of filters and other components needed for its operation. The oscillating signals from these two frequency sources are scaled, combined, mixed, and filtered, such that only two primary frequency sources are needed to operate the front-end and back-end of both the transmitter and receiver of this dual band transceiver.

30 Claims, 2 Drawing Sheets

MULTI-BAND TRANCEIVERS WITH REDUCED FREQUENCY SOURCES FOR DIGITAL TRANSMISSIONS

TECHNICAL FIELD

This invention relates to the architecture of communications equipment and; more particularly, to a system of minimizing the frequency sources and filters in communications transceivers.

BACKGROUND OF THE INVENTION

As the cellular and wireless communication industries continue to define themselves, the promulgation of various standards and protocols continue to plague the industry. This plague along with the partitioning of the frequency spectrum has assured the need for dual-band, dual-mode radio transceivers into the foreseeable future.

Some manufacturers of radio telephone devices have succeeded in providing transceivers that are dual-mode (transceivers that support two or more protocols) and/or dual-band (transceivers that operate in multiple frequency ranges). However, these dual-band, dual-mode transceivers have distinct disadvantages which are addressed by the present invention. Early versions of dual-band transceivers included two transceivers that had the electronic components necessary to operate in both bands. This was the equivalent of taking two transceivers that operate in different bands and taping them back-to-back. The inefficiencies of component usage, power consumption, and the size were unacceptable.

In today's dual-band radio transceivers, the components of one band are shared to allow the transceiver to work in a second band. One key to today's technology is to use an oscillator (frequency source) that may be shifted between a first and a second frequency range. The frequency range of the frequency source is primarily a function of the band in which the transceiver is transmitting or receiving. However, prior art techniques have not fully reduced the number of oscillators required in a dual-band transceiver to the level achieved by the present invention. Thus, a first objective of the present invention is to reduce the component count, particularly the frequency sources and filters needed in a dual-band transceiver.

In addition to the use of a multiple band frequency source, a fixed second frequency source is utilized in some of the techniques provided today. In some prior art transmitters, the dual-band frequency source generates a first oscillation frequency and the second frequency source generates a second oscillation frequency. However, prior art fails to utilize the two oscillators for all the primary needs in both the transmitter and the receiver front and back-ends. Thus, it is another objective of the present invention to minimize the number of frequency sources required for the transmitter and the receiver front and back-ends.

SUMMARY OF THE INVENTION

The present invention is a transceiver that can process signals in multiple bands, requiring a reduced number of frequency sources and filters. The dual band transceiver requires only two frequency sources to accomplish the entire front and back-end of the transmitter and receiver section. Thus, one inventive aspect of the present invention is the reduced number of frequency sources. A second inventive aspect is at least one of the frequency sources has an expanded frequency range, enabling the transceiver to handle an increased number of frequency bands. The advantage of the present invention, and the aforementioned inventive aspects, is a reduced number of components (including frequency sources and filters), and cost.

The frequency of the transmit and receive channels are separated by the off-set of the frequency sources. The first frequency source is fed to both the input transmitter mixers, which also receive the I and Q inputs. Each of the transmitter mixers individually combine the first frequency source output and the input signals (unmodulated I and Q transmit signal). The output of the input transmitter mixers are summed together to form a modulated signal (IF transmit signal). The IF transmit signal is the input to a first band and a second band output transmitter mixer. In addition, the second frequency source has a direct electrical connection to the first band output transmitter mixer and is connected to the second band output transmitter mixer through a frequency scaler. If the transceiver is in a first band, the second frequency source signal is combined with the IF transmit signal, resulting in a transmitter output signal (RF transmit signal) corresponding to the first band. However, when the transceiver is operating in the second band, a scaled second frequency source signal is combined with the IF transmit signal by the second band output transmitter. The result is an RF transmit signal corresponding to the second band.

The two frequency sources are also utilized for the receiver section of the transceiver. If the transceiver is operating in a first band, the first band input receiver mixer combines the input signal (RF receive signal) with the second frequency source signal, to obtain a first IF receive signal. If the transceiver is operating in a second band, the second band input receiver mixer combines the RF receive signal with a scaled second frequency source signal, to obtain a first IF receive signal. In another exemplary embodiment, the first IF receive signal is down-converted again to obtain a second IF signal. Finally, the IF receive signal (or second IF receive signal) is combined with the first frequency source signal, to obtain an output receiver signal (unmodulated receive signal). By using a programming means to set the frequency of the first and/or second frequency source, and by using scalers to obtain specific frequencies, the transceiver may operate in both bands.

DETAILED DESCRIPTION

Figure 1:
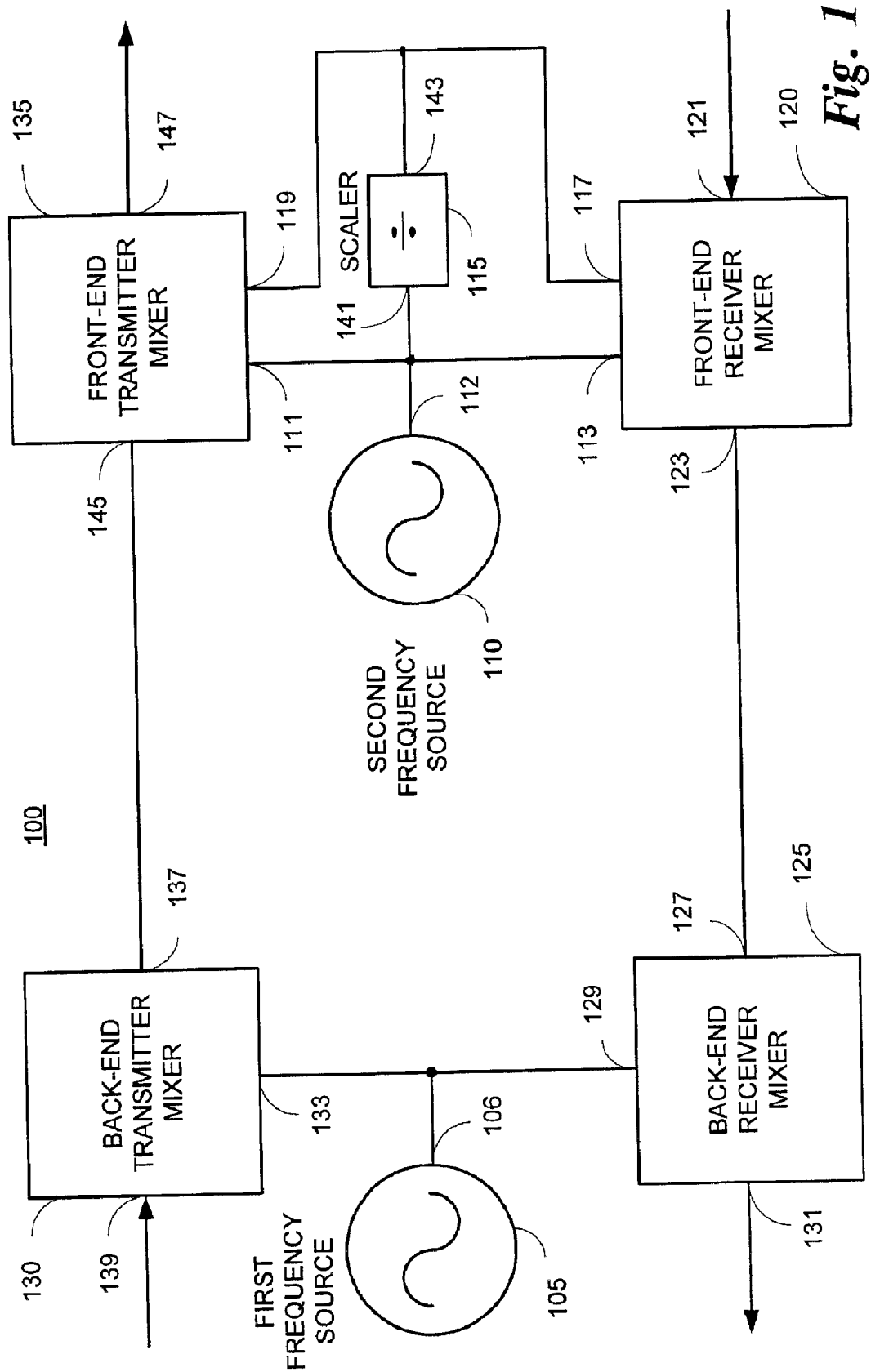
FIG. 1 is a block diagram 100 that illustrates an exemplary embodiment of the present invention.

FIG. 1 is a block diagram 100 that illustrates an exemplary embodiment of the present invention, capable of transmitting and receiving in a first and second frequency band. Certain signals which may be present while transmitting and receiving in one band, may not be present while operating in the second band. In implementing the present invention, there were certain assumptions made about the baseband processor:

1. The baseband can modulate both digital signals and FM analog signals through the transmitter I and Q inputs of the modulator. The digital signals can be in the form of Π/4DQPSK, GSM, 8-PSK or any digital modulation scheme that could be utilized in a TDMA system. This ability to modulate both digital and FM analog signals allows the same IF oscillator to be shared between the receiver and transmitter, since the IF oscillator is not modulated directly during FM mode.

2. Both digital signals and FM analog signals are demodulated in the quadrature demodulator in the receiver and outputted through the receiver I and Q outputs to be further processed by the baseband.

3. In digital mode, the RF Phase Locked-Loop (PLL) can be programmed by the baseband processor to change frequency between the receive and transmit slots. For Time Division Multiplexing (TDMA) systems, the receiver and transmitter do not operate simultaneously and the RF PLL can change frequency as long as the frequency is settled before the receive and transmit slots time periods.

The first frequency source 105 is used as the oscillating source for upconverting the incoming transmit signal which is applied at the input 139. The incoming transmit signal is a digitized representation of a voice or data signal. The first frequency source 105 has an output 106 which is electrically coupled such that its signal is applied at the input 133 of the back-end transmitter mixer 130. The first frequency source 105 may be a voltage controlled oscillator (VCO) or other frequency source capable of providing the frequency necessary for the upconversion of the incoming transmit signal. The frequency source of this embodiment is stabilized by a phase-locked loop configuration, which is known to those skilled in the art.

While operating in the first band, the back-end transmitter mixer 130 upconverts (combines) the incoming transmit signal and the frequency from the first frequency source 105. As is known in the industry, the input 139 to the back-end transmitter mixer 130 may take on a variety of forms but a common form includes an in-phase "I" signal and an out-of-phase "Q" signal. The output 137 of the back-end transmitter mixer 130 is an IF transmit signal. Those skilled in the art will realize the IF transmit may also have been filtered to obtain the necessary frequency for downstream processing. Filtering techniques are known by the skilled artisan, and are not detailed in block diagram 100. Along with the frequency sources, the present invention reduces the number of filters needed by using common transmit and receive IF paths for any band.

The IF transmit signal from the back-end transmitter mixer 130 is electrically coupled to the first input 145 of the front-end transmitter mixer 135. The front-end transmitter mixer 135 also has a second and third input. A second input 111 of the front-end transmitter mixer 135 is electrically coupled to the output 112 of the second frequency source 110. This connection provides the second oscillating signal to the front-end transmitter mixer 135 during operation in the first band. In one embodiment, the second frequency source 110 is programmable, and capable of oscillating over a range of frequencies. While the transceiver is operating in the first band, the front-end transmitter mixer combines the IF transmit signal and the second oscillating signal to obtain a final transmitter frequency corresponding to the first band at the output 147.

When the invention is operating in the second band, the operation is basically similar to the operation in the first band; however, the differences are included below. The back-end transmitter mixer 130 combines the input transmit signal at a first input 139 and the first oscillating signal from the first frequency source 105 at a second input 133 of the back-end transmitter, to generate an IF transmit signal at the output 137. This IF transmit signal is then provided to the input 145 of the front-end transmitter mixer 135. When the transceiver is operating in the second band the output 112 of the second frequency source 110 is passed to the input 141 of a frequency scaler 115. A scaler is a device that multiplies or divides a frequency at its input to provide a scaled frequency output in accordance with its multiplication or division factor. The signal at the output 143 of the frequency scaler 115, the scaled second oscillating signal, is provided to the input 119 of the front-end transmitter mixer 135. The front-end transmitter mixer 135 combines the IF transmit signal and the scaled second oscillating signal, to generate at its output 147, the final transmitter frequency corresponding to the second band. Regardless of which band the transceiver is operating in, the front-end transmitter mixer 135 receives the same IF transmit signal at input 145.

In addition to transmitting in a first and second band, the transceiver also receives in a first and second band. While operating in the first band, the second frequency source 110 generates the second oscillating signal corresponding with the first band. The second frequency source 110 has an output 112 which is electrically coupled to a first oscillating input 113 of the front-end receiver mixer 120.

While the transceiver is operating in the first band, the front-end receiver mixer 120 receives the second oscillating signal from the second frequency source 110 at the first oscillating input 113. RF receive signals are received at the RF input 121 of the front-end receiver mixer 120 and are combined with the second oscillating signal to generate an IF receive signal at output 123.

When the transceiver is operating in the second band, the second frequency source 110 provides an oscillating signal at its output 112 to the second oscillating input 117 of the front-end receiver mixer 120 through the scaler 115. The oscillating signal at the output 112 of the second frequency source 110 is electrically coupled to the input 141 of the scaler 115. The output 143 of the scaler 115 is electrically coupled to the second oscillating input 117 of the front-end receiver mixer 120. Thus, the front-end receiver mixer 120 receives the scaled second oscillating signal corresponding to the second band and mixes this oscillating signal with the RF signal to generate an IF receive signal.

The IF output 123 of the front-end receiver mixer 120 is electrically coupled to the IF receive input 127 of the back-end receiver mixer 125. If the transceiver is operating in the first band, the back-end receiver mixer 125 receives an IF receive signal generated by combining the second oscillating signal and the RF receive signal. Similarly, if the transceiver is operating in the second band, the back-end receiver mixer 125 receives an IF receive signal generated by combining the scaled second oscillating signal and the RF receive signal. The IF receive signal is the same input to the IF receive input 127, no matter which band the transceiver is operating in at the time.

In addition to the IF input 127, the back-end receiver mixer 125 also has an oscillating input 129 electrically connected to the output 106 of the first frequency source 105. Regardless of which band the transceiver is operating, the back-end receiver mixer 125 receives the same IF receive signal at the IF input 127 and combines it with the first oscillating signal at oscillating input 129. The output 131 of the back-end receiver mixer 125 is an unmodulated receiver signal (baseband) corresponding to the appropriate band.

It should be noted that other embodiments of this invention could be implemented with formats other than TDMA; including GSM, EDGE, and CDMA formats.

Figure 2:
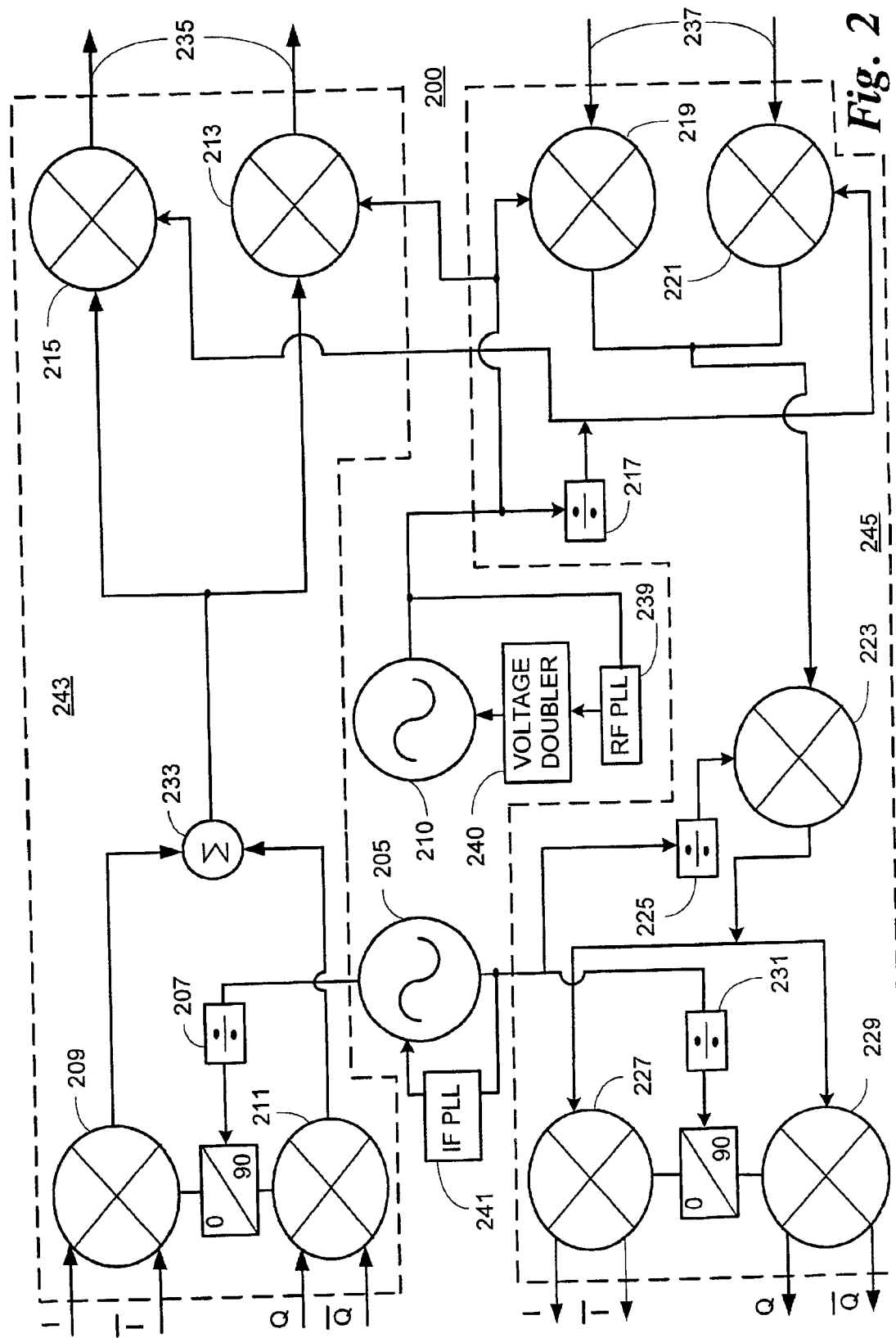
FIG. 2 is a detailed schematic diagram 200 illustrating the components and functional blocks necessary in an exemplary embodiment of the present invention.

FIG. 2 illustrates a detailed schematic diagram 200 of an exemplary embodiment of the present invention. In general, the schematic can be viewed as including a transmitter path 243, a receiver path 245, and two frequency sources 205 and 210. The first frequency source 205 is preferably connected in a phase-locked loop configuration. The first frequency source 205 is also preferably programmable to oscillate at a range of frequencies. Note, the transmitter shown in diagram 200 uses the same transmitter Intermediate Frequency for both bands. In an alternative embodiment, the second frequency source 210 includes a voltage doubler 240 to extend the tuning range of the frequency source. The voltage doubler 240 would be electrically coupled to the output of the RF phase-locked loop 239 and allow the control signal to the second frequency source 210 to have a greater frequency range.

The details of figure 200 are best considered by discussing the components which are common to the transmitter path 243 and the receiver path 245. Discussion of the common components will be followed by discussing the first and second band operation of the transmitter path 243, and finally the first and second band operation of the receiver path 245.

The first frequency source 205 and the second frequency source 210 are common to the transmitter path 243 and the receiver path 245. The frequency of the first frequency source 205 is maintained by the IF Phase Lock Loop circuitry 241. Similarly, the frequency of the second frequency source 210 is maintained by the RF Phase Lock Loop circuitry 239.

The I and Q inputs (baseband) are the inputs to the first transmitter mixer 209 and the second transmitter mixer 211 associated with the transmitter path 243. In addition, the first transmitter mixer 209 and the second transmitter mixer 211 are electrically coupled to the input of a first frequency scaler 207 associated with the transmitter path 243. The first frequency scaler 207 receives a first oscillating signal from the first frequency source 205 and provides a scaled first oscillating signal to the first transmitter mixer 209 and the second transmitter mixer 211. Those skilled in the art will recognize that the two mixers are in a typical 90 degree phase shift from one another as is standard in processing I and Q components of a signal. Thus, both mixers will combine their respective transmitter signal inputs with the scaled first oscillating signal and their respective outputs will be summed together in summation device 233. The summation of the respective first and second transmitter mixers form an IF transmit signal. Depending on the band of operation of the transceiver 200, the IF transmit signal will be the input to either the third transmitter mixer 213 or the input of the fourth transmitter mixer 215. The third transmitter mixer 213 and the fourth transmitter mixer 215 are used to convert the IF transmit signal to RF.

The second input to both the third transmitter mixer 213 and the fourth transmitter mixer 215, is the second oscillating signal, which is the output of the second frequency source 210. The second frequency source 210 is preferably a programmable frequency source with a capability to oscillate in a range of frequencies.

As previously mentioned, the transceiver 200 can operate in multiple bands, referred to for convenience as a first band and a second band. While operating in the first band, the path for converting the IF signal to an RF signal includes a third transmitter mixer 213. The third transmitter mixer 213 will combine the IF signal with the second oscillating signal from the second frequency source 210. During operation in the first band, the fourth transmitter mixer 215 is disabled. Skilled artisans may use one of several common techniques to disable the fourth transmitter mixer 215 at the appropriate time, but the present invention is not concerned with details of which technique is used. The output 235 of third transmitter mixer 213 is an RF transmit signal corresponding to the first band. This RF signal may be subsequently provided to antenna circuitry (not shown) for transmission.

Similarly, if the transceiver 200 is operating in a second band, the second oscillating signal from the second frequency source 210 is the input to the fourth transmitter mixer 215, through a second frequency scaler 217. The input to the second frequency scaler 217 is the second oscillating signal from the second frequency source 210. The output of the second frequency scaler 217 is a scaled second oscillating signal, which is the input to the fourth transmitter mixer 215. The fourth transmitter mixer 215 will combine the IF transmit signal with the scaled second oscillating signal. The output 235 of the fourth transmitter mixer 215 is an RF transmit signal corresponding to the second band.

As previously described, in addition to the capability of transmitting in a first and second band, the transceiver is capable of receiving in a first and second band. The first receiver mixer 219 and second receiver mixer 221 are located in the receiver path 245, and are used for converting the RF to IF. The second frequency source 210 is electrically connected to both the first receiver mixer 219 and second receiver mixer 221. However, the second frequency source 210 is electrically coupled to the second receiver mixer 221 through a second frequency scaler 217. In addition, both the first receiver mixer 219 and second receiver mixer 221 have an RF input 237, and their respective outputs are electrically coupled to the first input of a third receiver mixer 223.

When the transceiver 200 is operating in the first band, the second frequency source 210 has an output of a second oscillating signal. The second oscillating signal is the input to the first receiver mixer 219; however, if necessary the second oscillating signal may be scaled. In addition, the first receiver mixer 219 receives an RF incoming signal 237 on a second input. The first receiver mixer 219 combines the RF incoming signal 237 and the second oscillating signal. The output of the first receiver mixer 219 is a first receiver IF. Thus, the first receiver IF is the input to the third receiver mixer 223.

However, when the transceiver 200 is operating in the second band, the output of the second frequency source 210, a second oscillating signal, is connected to the input of the second frequency scaler 217. The output of the second frequency scaler 217 is a scaled second oscillating signal. Thus, the scaled second oscillating signal is the input to the second receiver mixer 221. In addition, the second receiver mixer 221 receives an RF incoming signal. The second receiver mixer 221 combines the RF incoming signal and the scaled second oscillating signal. The output of the second receiver mixer 221 is the first receiver IF, which is connected to the third receiver mixer 223. Thus, the input to the third receiver mixer 223 is the first receiver IF. It should be noted that the first receiver mixer 219 is not operational when the transceiver 200 is operating in the second band, nor is the second receiver mixer 221 operational while the transceiver 200 is operating in the first band.

In addition to receiving the first receiver IF signal, the third receiver mixer 223 also has a second input which is electrically connected to the first frequency source 205, through a third frequency scaler 225. The first frequency output of the first frequency source 205 is the input to the third frequency scaler 225. The output of the third frequency scaler 225 is a scaled first oscillating signal. Thus, the scaled first oscillating signal is the second input of the third receiver mixer 223.

The third receiver mixer 223 combines the scaled first oscillating signal and the first receiver IF signal, regardless of which band the transceiver 200 is operating in at the time. The output of the third receiver mixer 223, is a second receiver IF, electrically connected to the fourth receiver mixer 227 and the fifth receiver mixer 229.

The fourth receiver mixer 227 and fifth receiver mixer 229 are 90 degrees out of phase with one another and arranged in the common form of in-phase "I" signal and an out-of-phase "Q" signal, which is known by the skilled artisan. Thus, further details of the I and Q arrangement are herein omitted.

A second input to the fourth receiver mixer 227 and fifth receiver mixer 229 is a scaled first oscillating signal from the first frequency source 205 through a fourth frequency scaler 231. The input to the fourth frequency scaler 231 is the first oscillating signal from the first frequency source 205 and its output is a scaled first oscillating signal which is the input to the fourth receiver mixer 227 and fifth receiver mixer 229. When the transceiver 200 is functioning in either the first or second band, the fourth receiver mixer 227 and the fifth receiver mixer 229 each individually receive and combine the second receiver IF (received from the third receiver mixer 223) and the scaled first oscillating signal (received from the output of the fourth frequency scaler 231). The fourth receiver mixer 227 and the fifth receiver mixer 229 produce an unmodulated receive signal (baseband) on their respective receiver I and Q outputs, which may be further processed in the baseband processor (not shown).

Alternate embodiments will become apparent to those skilled in the art to which the present invention pertains without departing from its spirit and scope. Accordingly, the scope of the present invention is described by the appended claims and supported by the foregoing description.

What is claimed is:

1. A multiple band transceiver that allows for frequency scaling of an input signal while utilizing a reduced number of frequency sources, the transceiver comprising:
    a first frequency source operative to generate a first oscillating signal;
    a back-end transmitter mixer, electrically coupled to said first frequency source, operative to receive said first oscillating signal and an unmodulated transmit signal and to generate an Intermediate Frequency (IF) transmit signal;
    a back-end receiver mixer, electrically coupled to said first frequency source, operative to receive said first oscillating signal and an IF receive signal and to generate an unmodulated receive signal;
    a second frequency source operative to generate a second oscillating signal, wherein said second oscillating signal can correspond to a first band when said transceiver is operating in a first mode or a second band when said transceiver is operating in a second mode;
    a front-end transmitter mixer electrically coupled to said second frequency source, operative to receive said second oscillating signal and said IF transmit signal, to produce a Radio Frequency (RF) transmit signal that corresponds to said first band when said transceiver is operating in said first mode and corresponds to said second band when said transceiver is operating in said second mode; and
    a front-end receiver mixer electrically coupled to the second frequency source, operative to receive said second oscillating signal and an RF receive signal associated with said first band when said transceiver is operating in said first mode and associated with said second band when said transceiver is operating in said second mode, to generate said IF receive signal.

2. The multiple band transceiver of claim 1, wherein when operating in said first band, said front-end receiver mixer further comprises:
    an RF receive input for receiving said RF receive signal, an IF receive output, and said front-end receiver mixer being operative to combine said RF receive signal with said second oscillating signal to produce said IF receive signal.

3. The multiple band transceiver of claim 1, wherein when operating in said first band, said back-end receiver mixer further comprises:
    an IF receive input for receiving said IF receive signal associated with said first band, an unmodulated receive output, and said back-end receiver mixer being operative to combine said IF receive signal and said first oscillating signal to produce said unmodulated receive signal.

4. The multiple band transceiver of claim 1, wherein when operating in said first band, said back-end transmitter mixer further comprises:
    an unmodulated transmit input for receiving said unmodulated transmit signal, an IF transmit output, and said back-end transmitter mixer being operative to combine said unmodulated transmit signal and said first oscillating signal to produce said IF transmit signal.

5. The multiple band transceiver of claim 1, wherein when operating in said first band, said front-end transmitter mixer further comprises:
    an IF transmit input for receiving said IF transmit signal, an RF transmit output, and said front-end transmitter mixer being operative to combine said IF transmit signal corresponding to said first band and said second oscillating signal to produce said RF transmit signal corresponding to said first band.

6. The multiple band transceiver of claim 1, wherein when operating in said second band, said front-end receiver mixer further comprises:
    an RF receive input for receiving said RF receive signal, an IF receive output, and said front-end receiver mixer being operative to combine said RF receive signal and said scaled second oscillating signal to produce said IF receive signal.

7. The multiple band transceiver of claim 1, wherein when operating in said second band, said back-end receiver mixer further comprises:
    an IF receive input for receiving said IF receive signal, an unmodulated receive output, and said back-end receiver mixer being operative to combine said IF receive signal and said first oscillating signal to produce said unmodulated receive signal.

8. The multiple band transceiver of claim 1, wherein when operating in said second band, said back-end transmitter mixer further comprises:
    an unmodulated transmit input for receiving said unmodulated transmit signal, an IF transmit output, and said back-end transmitter mixer being operative to combine said unmodulated transmit signal and said first oscillating signal to produce said IF transmit signal.

9. The multiple band transceiver of claim 1, wherein when operating in said second band, said front-end transmitter mixer further comprises:
    an IF transmit input for receiving said IF transmit signal, an RF transmit output, and said front-end transmitter mixer being operative to combine said IF transmit signal and said second oscillating signal to produce said RF transmit signal corresponding to said second band.

10. The multiple band transceiver of claim 1, further comprising a programming mechanism which enables said second frequency source to be programmable to operate in said first and said second band.

11. The multiple band transceiver of claim 1, wherein said first band is a cellular band and said second band is a PCS band.

12. The multiple band transceiver of claim 1, wherein said first band is a GSM band and said second band is a DCS1800 band.

13. The multiple band transceiver of claim 1, wherein the second oscillator is in a phase-locked loop configuration, and said phase-locked loop includes a voltage doubler device, for extending the tuning range of said second oscillator and reducing the signal to noise ratio.

14. A radio telephone, having a dual band receiver for operating in a first band and a second band, said dual band receiver comprising:
- a first frequency source operative to generate a first oscillating signal;
- a second frequency source operative to generate a second oscillating signal;
- a front-end receiver mixer, having a Radio Frequency (RF) receive input for receiving an incoming RF receive signal, an oscillating signal input electrically coupled to said second frequency source and operative to receive said second oscillating signal when operating in said first band, a scaled oscillating signal input electrically coupled to said second oscillating signal through a scaler for receiving a scaled second oscillating signal when operating in said second band, and an Intermediate Frequency (IF) receive output for providing an IF receive signal generated by combining said incoming RF signal with said second oscillating signal when operating in said first band and for providing said IF receive signal generated by combining said incoming RF signal with said scaled second oscillating signal when operating in said second band; and
- a back-end receiver mixer, having an IF receive input for receiving said IF receive signal, an oscillating input electrically coupled to said first frequency source and operative to receive said first oscillating signal, and an unmodulated receive output for providing an unmodulated receive signal generated by combining said IF receive signal with said first oscillating signal.

15. The radio telephone of claim 14, wherein said dual band receiver further comprises a programming mechanism which enables said receiver to be programmable to operate in said first band and said second band.

16. The radio telephone of claim 14, wherein said second frequency source further comprises a programming mechanism which enables said receiver to be programmable to operate in said first band and said second band.

17. The radio telephone of claim 14, wherein said first band is a cellular band and said second band is a PCS band.

18. The radio telephone of claim 14, wherein said first band is a GSM band and said second band is a DCS1800 band.

19. A radio telephone, having a dual band transmitter for transmitting in a first band and a second band, said dual band transmitter comprising:
- a first frequency source operative to generate a first oscillating signal;
- a second frequency source operative to generate a second oscillating signal;
- a back-end transmitter mixer, having an unmodulated transmit input for receiving an unmodulated transmit signal, an oscillating signal input electrically coupled to said first frequency source and operative to receive said first oscillating signal, and an Intermediate Frequency (IF) transmit output for providing an IF transmit signal by combining said unmodulated transmit signal and said first oscillating signal; and
- a front-end transmitter mixer, having an IF transmit input for receiving an IF transmit signal, an oscillating signal input electrically coupled to the second frequency source and operative to receive said second oscillating signal when operating in said first band, a scaled oscillating signal input electrically coupled to the second frequency source through a scaler and operative to receive a scaled second oscillating signal when operating in said second band, and an RF transmit output for providing an RF transmit signal generated by combining said IF transmit signal and said second oscillating signal when operating in said first band and for providing said RF transmit signal generated by combining said IF transmit signal and said scaled second oscillating signal when operating in said second band.

20. The radio telephone of claim 19, wherein said dual band transmitter further comprises a programming mechanism which enables said dual band transmitter to be programmable to operate in said first band and said second band.

21. The radio telephone of claim 19, wherein said second frequency source further comprises a programming mechanism which enables said dual band transmitter to be programmable to operate in said first band and said second band.

22. The radio telephone of claim 19, wherein said first band is a cellular band and said second band is a PCS band.

23. The radio telephone of claim 19, wherein said first band is a GSM band and said second band is one of the following bands:
  (a) DCS1800 band;
  (b) cellular band; and
  (c) PCS band.

24. A radio telephone, having a dual band transceiver for transmitting and receiving in a first band and a second band, said first band and said second band each having a receive and a transmit channel, the dual band transceiver comprising:
- a first frequency source operative to generate a first oscillating signal;
- a first frequency scaler, having an oscillating signal input electrically coupled to said first frequency source for receiving said first oscillating signal, and a scaled oscillating signal output for providing a first scaled first oscillating signal;
- a first transmitter mixer, having an unmodulated transmit input for receiving an unmodulated transmit signal, a first frequency scaler input electrically coupled to said first frequency scaler for receiving said first scaled first oscillating signal, and an IF transmit output generated by combining said unmodulated transmit signal and said first scaled first oscillating signal;
- a second transmitter mixer, having an unmodulated transmit input for receiving an unmodulated transmit signal, a first frequency scaler input electrically coupled to said first frequency scaler for receiving said first scaled first oscillating signal having a 90 degree phase shift, and an IF transmit output for providing an IF transmit signal generated by combining said unmodulated transmit signal and said first scaled first oscillating signal with said 90 degree phase shift;

a second frequency source operative to generate a second oscillating signal, wherein said second frequency source is programmable to operate in said first band and said second band;

a third transmitter mixer, having an IF transmit input electrically coupled to said first and said second mixer for receiving said IF transmit signal generated by summing said IF transmit signal from said first mixer and said second mixer, an oscillating signal input electrically coupled to said second frequency source for receiving said second oscillating signal when operating in said first band, and an RF transmit output for providing an RF transmit signal generated by combining said IF transmit signal and said second oscillating signal when operating in said first band;

a second frequency scaler, having an oscillating signal input electrically coupled to the second frequency source for receiving a second oscillating signal, and a scaled oscillating signal output for providing a scaled second oscillating signal; and a fourth transmitter mixer, having an IF transmit input electrically coupled to said first and said second mixer for receiving said IF transmit signal generated by summing said IF transmit signal from said first mixer and said second mixer, an oscillating signal input electrically coupled to said second frequency source through said second frequency scaler for receiving said scaled second oscillating signal when operating in said second band, and an RF transmit output for providing an RF transmit signal generated by combining said IF transmit signal and said scaled second oscillating signal when operating in said second band.

25. The radio telephone of claim 24, wherein said dual band transceiver further comprises:

a first receiver mixer, having a Radio Frequency (RF) receive input for receiving an RF receive signal input, an oscillating signal input electrically coupled to said second frequency source for receiving said second oscillating signal when operating in said first band, an IF receive output for providing a first IF receive signal generated by combining said second oscillating signal with said RF receive signal when operating in said first band;

a second receiver mixer, having a Radio Frequency (RF) receive input for receiving an RF receive signal, an oscillating signal input electrically coupled to said second scaler for receiving said scaled second oscillating signal when operating in said second band, an IF receive output for providing an IF receive signal generated by combining said scaled second oscillating signal with said RF receive signal when operating in said second band;

a third frequency scaler, having an oscillating signal input electrically coupled to said first frequency source for receiving said first oscillating signal, and a scaled first oscillating signal output for providing a second scaled first oscillating signal;

a third receiver mixer, having a scaled oscillating signal input electrically coupled to said third frequency scaler for receiving said second scaled first oscillating signal, an IF receive input for receiving said first IF receive signal, and a second IF receive output for providing a second IF receive signal generated by combining said second scaled first oscillating signal and said first IF receive signal;

a fourth frequency scaler, having an oscillating signal input electrically coupled to said first frequency source for receiving a first oscillating signal, a scaled oscillating signal output for providing a third scaled first oscillating signal;

a fourth receiver mixer, having a second IF input electrically coupled to said third receiver mixer for receiving said second IF signal, an oscillating signal input electrically coupled to said fourth frequency scaler for receiving said third scaled first oscillating signal, and an unmodulated receive output for providing an unmodulated receive signal generated by combining said second IF signal and said third scaled first oscillating signal; and a fifth receiver mixer, having a second IF input electrically coupled to said third receiver mixer for receiving said second IF signal, an oscillating signal input electrically coupled to said fourth frequency scaler for receiving said third scaled first oscillating signal having a 90 degree phase shift, and an unmodulated receive output for providing an unmodulated receive signal generated by combining said second IF signal and said third scaled first oscillating signal having said 90 degree phase shift.

26. The dual band transceiver of claim 25, further comprising a programming mechanism which enables said receiver to be programmable to operate in the first and the second band.

27. The dual band transceiver of claim 25, wherein said second frequency source further comprises a programming mechanism which enables said receiver to be programmable to operate in the first and the second band.

28. The dual band transceiver of claim 25, wherein said first band is a cellular band and said second band is a PCS band.

29. The radio telephone of claim 25, wherein said first band is a GSM band and said second band is one of the following bands:
(a) DCS1800 band;
(b) cellular band; and
(c) PCS band.

30. A method of operating a dual band transceiver device that allows for frequency scaling of a signal while utilizing a reduced number of frequency sources, the method comprising:

generating a first oscillating signal;
generating a second frequency signal;
if said dual band transceiver device is operating in said first band, further performing the following steps:
receiving an unmodulated transmit signal;
generating an IF transmit signal by combining said unmodulated transmit signal and said first oscillating signal;
generating an RF transmit signal corresponding to said first band by combining said IF transmit signal and said first oscillating signal;
receiving a Radio Frequency (RF) receive signal;
generating an IF receive signal by combining said RF receive signal with said second frequency signal;
generating an unmodulated receive signal by combining said IF receive signal and said first oscillating signal;

if said dual band transceiver device is operating in said second band, further performing the following steps:
  receiving an unmodulated transmit signal;
  generating an IF transmit signal by combining said unmodulated transmit signal and said first oscillating signal;
  generating an RF transmit signal associated with said second band by combining said IF transmit signal and a scaled second frequency signal;
  receiving an RF receive signal;
  generating said scaled second frequency signal by scaling said second frequency signal;
  generating an IF receive signal by combining said RF receive signal with said scaled second frequency signal; and
  generating an unmodulated receive signal by combining said IF receive signal and said first oscillating signal.

* * * * *